United States Patent [19]

Ikematu et al.

[11] 4,446,290

[45] May 1, 1984

[54] PROCESS FOR PRODUCING CONJUGATED DIENE POLYMER

[75] Inventors: Takeshi Ikematu; Yasuo Hattori, both of Yokohama, Japan

[73] Assignee: Asahi Kasei Kogyo Kabushiki Kaisha, Osaka, Japan

[21] Appl. No.: 361,754

[22] Filed: Mar. 25, 1982

[30] Foreign Application Priority Data

Mar. 27, 1981 [JP] Japan .................................. 56-43993

[51] Int. Cl.$^3$ ................... C08F 136/08; C08F 236/08; C08F 4/46; C08F 4/50
[52] U.S. Cl. .................................................... 526/174
[58] Field of Search ........................................ 526/174

[56] References Cited

U.S. PATENT DOCUMENTS

| | | | |
|---|---|---|---|
| 3,629,213 | 12/1971 | Onishi et al. | 526/181 |
| 3,846,385 | 11/1974 | Hargis et al. | 526/174 |
| 4,080,492 | 3/1978 | de Zarauz | 526/177 |
| 4,129,705 | 12/1978 | de Zarauz | 526/174 |
| 4,136,244 | 1/1979 | Massoubre | 526/174 |

FOREIGN PATENT DOCUMENTS 37616 10/1981 European Pat. Off. ............ 526/174

*Primary Examiner*—Joseph L. Schofer
*Assistant Examiner*—Peter F. Kulkosky
*Attorney, Agent, or Firm*—Birch, Stewart, Kolasch & Birch

[57] ABSTRACT

Conjugated diene polymers and copolymers having a high ratio of a trans-1,4 structure content to a cis-1,4 structure content in the diene moiety can be advantageously solution polymerized by using a novel catalyst complex consisting essentially of the following components (a) and (b) or (a), (b), and (c): (a) an organosodium compound, metallic sodium or a sodium amide compound, or a mixture of at least one thereof with an organic compound of sodium other than the sodium amide compound; (b) an organic or organometallic compound of barium, strontium, or calcium; (c) an organometallic compound of an electron deficient metal selected from lithium, beryllium, magnesium, zinc, cadmium, boron, aluminum, gallium, or indium.

12 Claims, No Drawings

PROCESS FOR PRODUCING CONJUGATED DIENE POLYMER

The present invention relates to a process for producing conjugated diene polymers and copolymers having a high ratio of a trans-1,4 structure content to a cis-1,4 structure content in the diene moiety by means of a solution polymerization method by using a novel catalyst complex.

Various processes for polymerizing conjugated dienes by using as a polymerization catalyst alkali metals or organometallic compounds of alkali metals have been proposed. On the other hand, only a few processes for polymerizing conjugated dienes by using as a polymerization catalyst alkaline earth metals (i.e. II A metals of the periodic table of elements) or organometallic compounds of alkaline earth metals have been proposed. Of the II A metals, the organometallic compounds of beryllium and magnesium can be relatively readily synthesized. However, the reactivity thereof is inferior to that of the organometallic compounds of alkali metals and, therefore, the polymerization activity thereof in the case of conjugated dienes can only be effective under limited conditions although the polymerization activity is remarkably low. For this reason, the organometallic compounds of beryllium and magnesium can not be practically used in the polymerization of conjugated dienes. Furthermore, the organometallic compounds of barium, strontium, and calcium are extremely difficult to synthesize. Polymerization processes of conjugated dienes in the presence of special organometallic compounds of alkaline earth metals have recently been proposed. However, the polymerization activity is extremely low and, therefore, these polymerization processes cannot now be utilized commercially.

On the other hand, several polymerization processes of conjugated dienes using a combination catalyst of the organic compounds of alkaline earth metals such as barium, strontium, and calcium and other organometallic compounds have been proposed. For instance, U.S. Pat. No. 3,629,213 discloses a method for preparing butadiene polymers using a catalyst consisting of, for example, an organolithium compound and an organic compound of barium. U.S. Pat. No. 3,846,385 discloses a method for preparing butadiene polymers using a catalyst complex of barium di-tert-butoxide and dibutyl magnesium. Furthermore, U.S. Pat. No. 4,080,492 discloses a process for preparing conjugated diene polymers using a catalyst composition of an organo-lithium, -barium or -strontium compound and an organometallic compound of the II B or II A metals. These polymerization processes using catalyst complexes or compositions containing organometallic compounds of alkaline earth metals can provide rubberlike polymers having a high ratio of a trans-1,4 structure content to a cis-1,4 structure content in the diene moiety thereof and having a relatively high molecular weight. These polymers are believed to be useful in the manufacture of various rubber products including automotive tires since they have excellent characteristics including green strength, tensile strength, and abrasion resistance of the vulcanizates thereof.

However, these polymerization processes using the above-mentioned catalyst complexes or compositions involve various disadvantages or problems. For example, in the case where polymers having a molecular weight sufficient to provide the desired properties are to be obtained, the amounts of the catalysts to be used should be decreased, which decrease would result in a remarkable decrease in the polymerization activity. In the case where the desired polymers are to be obtained at a high yield, the molecular weight distribution of the resultant polymers is remarkably broad, resulting in a remarkable decrease in the strength and abrasion resistance of the vulcanizates. In the case where copolymers of conjugated dienes and aromatic vinyl hydrocarbons are to be obtained, the copolymerization characteristics are not sufficient to produce the desired copolymers having the desired strength and heat buildup properties of the vulcanizates. Furthermore, although the polymers having a high trans-1,4 structure content and being obtained by the use of the above-mentioned catalyst complexes or compositions have the excellent physical properties mentioned above, these polymers have disadvantages such as poor processability and undesirable heat build-up of the vulcanizates, which disadvantages are due to the crystallization of the polymers at non-extension conditions, which crystallization is believed to be caused by the presence of long trans-1,4 structure chains.

Accordingly, an object of the present invention is to eliminate the above-mentioned disadvantages or problems of the prior art and to provide a process for preparing conjugated diene polymers or copolymers having a high ratio of trans-1,4 structure content to a cis-1,4 structure content in the diene moiety, a relatively narrow molecular weight distribution, and no crystallization property as determined by a differential thermal analyzer.

Another object of the present invention is to provide a catalyst complex suitable for use in the polymerization and copolymerization of conjugated dienes which has a remarkably excellent polymerization activity compared with that of conventional catalysts and can produce copolymers of conjugated dienes with aromatic vinyl hydrocarbons having an excellent random property.

Other objects and advantages of the present invention will be apparent from the following description.

In accordance with the present invention, there is provided a process for producing a conjugated diene polymer, a copolymer of a conjugated diene with at least one other conjugated diene, or a copolymer of a conjugated diene with an aromatic vinyl hydrocarbon comprising the step of polymerizing said monomer or monomers in the presence of a catalyst complex consisting essentially of the following components (a) and (b) or (a), (b), and (c):

(a) an organosodium compound, metallic sodium or a sodium amide compound, or a mixture of at least one thereof with an organic compound of sodium other than the sodium amide compound;

(b) an organic or organometallic compound of barium, strontium, or calcium;

(c) an organometallic compound of an electron deficient metal selected from lithium, beryllium, magnesium, zinc, cadmium, boron, aluminum, gallium, or indium.

The term "an organometallic compound (e.g. an organosodium compound)" used herein means an organic compound containing a metallic atom (e.g. sodium) directly bonded to a carbon atom, whereas the term "an organic compound of a metal (e.g. sodium)" used herein means an organic compound containing only a metallic atom (e.g. sodium) bonded to a carbon atom via an atom such as oxygen, sulfur, nitrogen, or the like.

The catalyst complexes used in the present invention have a remarkably excellent polymerization activity as compared to that of conventional catalysts and can produce copolymers having an excellent random structure of conjugated dienes such as butadiene and isoprene and aromatic vinyl hydrocarbons such as styrene. Furthermore, the polymers or copolymers of conjugated dienes obtained by the use of the above-mentioned catalyst complexes have the following advantages:

(i) The conjugated diene polymers or copolymers have a high trans/cis ratio in the micro-1,4-structure, for example, a trans/cis ratio of 2.0 or more in the case of butadiene.

(ii) The conjugated diene polymers or copolymers have no crystallization property as determined by a differential thermal analyzer.

(iii) The conjugated diene polymers or copolymers have a relatively narrow molecular weight distribution, for instance, a ratio of weight-average molecular weight/number-average molecular weight of 1.2 through 3.0.

According to the present invention, the conjugated diene polymers or copolymers having excellent rubber characteristics and being suitable for use as raw materials in the manufacture of automotive tires can be produced in good yield in a relatively short period of time.

The monomers usable in the process of the present invention are selected from the group of (1) conjugated dienes, (2) mixtures of a certain conjugated diene and one or more conjugated dienes, and (3) mixtures of conjugated diene(s) and aromatic vinyl hydrocarbon(s). The conjugated dienes desirably used in the present invention are those having 4 through 12 carbon atoms in a molecule thereof. Examples of such conjugated dienes are 1,3-butadiene, isoprene, 2,3-dimethyl-1,3-butadiene, 1,3-pentadiene, 2,4-hexadiene, and 2-phenyl-1,3-butadiene. The aromatic vinyl hydrocarbons usable in the process of the present invention are those containing at least one vinyl group bonded to the carbon atom of the aromatic ring. The aromatic vinyl compounds desirably used in the present invention are those having 8 through 20 carbon atoms in a molecule thereof. Examples of such aromatic vinyl hydrocarbons are styrene, divinylbenzene, vinyltoluene, 1-vinylnaphthalene, α-methylstyrene, and methoxystyrene.

The most desirable commercial polymerization processes of the present invention are butadiene homopolymerization, butadiene-isoprene copolymerization, and styrene-butadiene copolymerization.

The sodium compounds usable as the first component (a) of the novel catalyst complexes of the present invention are selected from the group of organosodium compounds, metallic sodium or sodium amide compounds, or mixtures of at least one of said sodium compounds (including metallic sodium) and organic compound(s) of sodium other than the sodium amide compounds.

The organosodium compounds are represented by the following general formula:

$$R'(Na)_m$$

wherein R' is an aliphatic group, desirably having 1 to 30 carbon atoms, an alicyclic group, desirably having 5 to 30 carbon atoms, or an aromatic group, desirably having 6 to 30 carbon atoms or an unsaturated hydrocarbon group having at least one allyl hydrogen and desirably having 3 to 30 carbon atoms, and m is an integer of 1 through 4.

Examples of the desirable R' group are the methyl, ethyl, iso-propyl, n-butyl, sec-butyl, n-amyl, tert-octyl, n-decyl, phenyl, naphthyl, 4-butylphenyl, cyclohexyl, 4-butylcyclohexyl, benzyl, allyl, triphenylmethyl, and fluorenyl groups.

The metallic sodium can be desirably used in the form of a dispersion in, for example, mineral oil, paraffin or wax. However, the metallic sodium can also be used in the form of an alloy such as an amalgam.

The sodium amide compounds are represented by the following general formula:

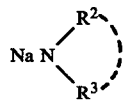

wherein

represents either a cyclized structure or a non-cyclized structure and $R^2$ and $R^3$ represent, in combination, a methylene chain having 2 to 10 carbon atoms in the case of a cyclized structure and $R^2$ and $R^3$ independently represent an aliphatic group, desirably having 1 to 30 carbon atoms, an alicyclic group, desirably having 5 to 30 carbon atoms, or an aromatic group, desirably having 6 to 30 carbon atoms in the case of a non-cyclized structure.

Examples of the desirable amide groups are the dimethylamide, diethylamide, di-iso-propylamide, di-n-butylamide, di-iso-butylamide, dioctylamide, diallylamide, dicyclohexylamide, diphenylamide, dibenzylamide, and N-ethylanilide groups. Examples of cyclized structures are the ethyleneimide, trimethyleneimide, pyrrolidido, piperidido, and hexamethyleneimide groups.

The organic compounds of sodium are selected from the group of compounds having the following general formulae:

$$R^4(Y-Na)_n \qquad (1)$$

$$R^4(\underset{\underset{Y}{\|}}{C}-Y-Na)_n \qquad (2)$$

$$R^4-Y-\underset{\underset{Y}{\|}}{C}-Y-Na \qquad (3)$$

$$R^4SO_3Na \qquad (4)$$

$$R^4OSO_3Na \qquad (5)$$

wherein $R^4$ is an aliphatic group, desirably having 1 to 30 carbon atoms, an alicyclic group, desirably having 5 to 30 carbon atoms, or an aromatic group, desirably having 6 to 30 carbon atoms, Y is an oxygen or sulfur atom, and n is an integer of 1 through 4.

Examples of such desirable compounds are sodium salts of the following compounds: ethyl alcohol, n-propyl alcohol, iso-propyl alcohol, tert-butyl alcohol, n- hexyl alcohol, cyclohexyl alcohol, allyl alcohol, cyclopentenyl alcohol, benzyl alcohol, ethanethiol, n-butanethiol, phenol, catechol, 1-naphthol, 2,6-di-tert-butylphenol, 2,4,6-tri-tert-butylphenol, nonylphenol, 4-phenylphenol, thiophenol, 2-naphthalenethiol, capric acid, lauryl acid, myristic acid, palmitic acid, stearic acid, oleic acid, linoleic acid, linolenic acid, naphthoic acid, benzoic acid, hexane thio acid, decane thio acid, tridecane thio acid, thiobenzoic acid, acid tert-butyl carbonate, acid hexyl carbonate, acid phenyl carbonate, thio acid tert-butyl carbonate butane sulfonic acid, hexane sulfonic acid, decane sulfonic acid, tridecane sulfonic acid, dodecylbenzene sulfonic acid, tetradecylbenzene sulfonic acid, octadecylbenzene sulfonic acid, dibutylnaphthalene sulfonic acid, di-iso-propylnaphthalene sulfonic acid, n-hexylnaphthalene sulfonic acid, dibutylphenyl sulfonic acid, sulfate ester of lauryl alcohol, sulfate ester of oleyl alcohol, and sulfate ester of stearyl alcohol.

The organic compounds or organometallic compounds of barium, strontium, or calcium usable as the second component (b) of the novel catalyst complexes of the present invention are selected from the group of compounds having the following general formulae:

$$(R^5Y)_2Me' \quad (1)$$

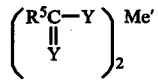   (2)

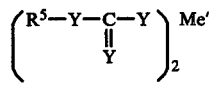   (3)

$$(R^5SO_3)_2Me' \quad (4)$$

$$(R^5OSO_3)_2Me' \quad (5)$$

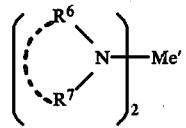   (6)

$$(R^5C\equiv C)_2Me' \quad (7)$$

$$(R^5)_2Me' \quad (8)$$

$$R^5Me'X \quad (9)$$

wherein $R^5$ is an aliphatic group, desirably having 1 to 30 carbon atoms, an alicyclic group, desirably having 5 to 30 carbon atoms, or an aromatic group, desirably having 6 to 30 carbon atoms,

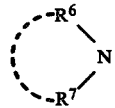

represents either a cyclized structure or a non-cyclized structure, and $R^6$ and $R^7$ represent, in combination, a methylene chain having 2 to 10 carbon atoms in the case of a cyclized structure and $R^6$ and $R^7$ independently represent an aliphatic group, desirably having 1 to 30 carbon atoms, an alicyclic group, desirably having 5 to 30 carbon atoms, or an aromatic group, desirably having 6 to 30 carbon atoms in the case of a non-cyclized structure provided that one of $R^6$ and $R^7$ can be hydrogen, Y is an oxygen or sulfur atom, Me' is a barium, strontium, or calcium atom, and X is a halogen atom such as fluorine, chlorine, bromine, or iodine.

Examples of the desirable organic compounds of the II A metals are barium, strontium, or calcium salts of the following compounds: ethyl alcohol, n-propyl alcohol, iso-propyl alcohol, tert-butyl alcohol, n-hexyl alcohol, cyclohexyl alcohol, allyl alcohol, cyclopentenyl alcohol, benzyl alcohol, ethanethiol, n-butanethiol, phenol, catechol, 1-naphthol, 2,6-di-tert-butylphenol, 2,4,6-tri-tert-butylphenol, nonylphenol, 4-phenylphenol, thiophenol, 2-naphthalenethiol, capric acid, lauryl acid, myristic acid, palmitic acid, stearic acid, oleic acid, linoleic acid, linolenic acid, naphthoic acid, benzoic acid, hexane thio acid, decane thio acid, tridecane thio acid, thiobenzoic acid, acid tert-butyl carbonate, acid hexyl carbonate, acid phenyl carbonate, thio acid tert-butyl carbonate butane sulfonic acid, hexane sulfonic acid, decane sulfonic acid, tridecane sulfonic acid, dodecylbenzene sulfonic acid, tetradecylbenzene sulfonic acid, octadecylbenzene sulfonic acid, dibutylnaphthalene sulfonic acid, di-iso-propylnaphthalene sulfonic acid, n-hexylnaphthalene sulfonic acid, dibutylphenyl sulfonic acid, sulfate ester of lauryl alcohol, sulfate ester of oleyl alcohol, sulfate ester of stearyl alcohol, dimethylamine, diethylamine, di-iso-propylamine, di-n-butylamine, mono-n-butylamine, di-iso-butylamine, mono-iso-butylamine, dioctylamine, diallylamine, dicyclohexylamine, phenylamine, diphenylamine, benzylamine, dibenzylamine, and N-ethylaniline.

Examples of the desirable organometallic compounds of the II A metals are dimethyl calcium, n-butyl calcium iodide, ethyl strontium idodide, dimethyl strontium, ethyl barium iodide, dimethyl barium, phenyl barium iodide, dicyclopentadienyl barium, bistriphenylmethyl barium, dipropargyl barium, and barium di-2-ethylacetylide.

The organometallic compounds of electron deficient metals usable as the third component (c) of the novel catalyst complexes of the present invention are lithium (Li) in the Group I A metals of the Mendeleev Periodic Table of Elements, beryllium (Be) and magnesium (Mg) in the Group II A metals, zinc (Zn) and cadmium (Cd) in the Group II B metals, and boron (B), aluminum (Al), gallium (Ga), and indium (In) in the Group III A metals and mixtures thereof.

These compounds are represented by the following general formula:

$$R^9_{p-q}Me^2X_q$$

wherein $R^9$ is an aliphatic group, desirably having 1 to 30 carbon atoms, an alicyclic group, desirably having 5 to 30 carbon atoms, or an aromatic group, desirably having 6 to 30 carbon atoms, X is a halogen atom such as fluorine, chlorine, bromine, or iodine, a hydrogen atom, or an alkoxy group, $Me^2$ is Li, Be, Mg, Zn, Cd, B, Al, Ga, or In, p is the valence of $Me^2$, and q is $0 \leq q \leq p-1$.

Examples of such desirable compounds are ethyl lithium, n-propyl lithium, iso-propyl lithium, n-butyl lithium, tert-butyl lithium, n-amyl lithium, n-hexyl lithium, allyl lithium, n-propenyl lithium, benzyl lithium, phenyl lithium, polybutadienyl lithium, polyisoprenyl lithium, polystyryl lithium, diethyl beryllium, di-n-propyl beryllium, di-n-butyl beryllium, ethyl beryllium chloride, diethyl magnesium, di-n-propyl magnesium, di-iso-propyl magnesium, di-tert-butyl magnesium, ethyl-n-butyl magnesium, di-n-hexyl magnesium, diphenyl magnesium, ethyl magnesium chloride, ethyl magnesium hydride, ethyl magnesium-iso-propoxide, iso-propyl magnesium chloride, n-butyl magnesium chloride, n-butyl magnesium bromide, phenyl magnesium chloride, diethyl zinc, ethyl zinc chloride, di-n-propyl zinc, di-iso-propyl zinc, diethyl cadmium, di-iso-propyl cadmium, ethyl cadmium chloride, trimethyl boron, triethyl boron, triethyl aluminum, tri-iso-butyl aluminum, diethyl aluminum chloride, diethyl aluminum hydride, diethyl aluminum propoxide, di-iso-butyl aluminum chloride, di-iso-butyl aluminum hydride, trihexyl aluminum, triphenyl aluminum, triethyl gallium, and triethyl indium.

The amounts of the components (a) and (b) or the components (a), (b), and (c) can vary greatly depending upon, for example, the purposes of polymerization and upon the polymerization methods and conditions. However, generally speaking, the use of the components in the following range is recommended:

Component (a): 0.01 through 50 m mol per 100 g of the total monomer(s)
Component (b): 0.01 through 10 times based on the mol of the component (a)
Component (c): 0 through 5 times based on the mol of the component (a)

In the case where the amount of the component (a) is too small, the polymerization activity tends to decrease. Contrary to this, in the case where the amount of the component (a) is too large, the molecular weight of the resultant polymer tends to decrease so that the resultant polymer is not suitable for use in general rubber industrial fields (e.g. the manufacture of automotive tires). In the case where the amount of the component (b) is too small, the molecular weight of the resultant polymer tends to decrease and the ratio of a trans-1,4/cis-1,4 structure content in the diene moiety also tends to decrease. Contrary to this, in the case where the amount of the component (b) is too large, the polymerization activity tends to decrease. Furthermore, in the case where the amount of the component (c) is too large, not only the polymerization activity tends to decrease but also the copolymerizability of conjugated dienes and aromatic vinyl hydrocarbons tends to decrease.

Especially in the case of polymers (or copolymers) having a relatively high molecular weight and being suitable for use as a starting material in the manufacture of automotive tires, the components can be desirably used in the following range:

Component (a): 0.1 through 1 m mol per 100 g of the total monomer(s)
Component (b): 0.1 through 1 times based on the mol of the component (a)
Component (c): 0 through 2 times based on the mol of the component (a)

The polymerization processes of the present invention can be desirably carried out in a solution polymerization manner using a hydrocarbon solvent, although a bulk polymerization method can be used. Examples of such hydrocarbon solvents are butane, pentane, hexane, heptane, octane, cyclohexane, cyclooctane, benzene, toluene, xylene, ethylbenzene, and mixtures thereof. Minor amounts of polar compounds can be added to the hydrocarbon solvent to improve the solubility and the catalytic activity of the catalyst complex. Examples of such polar compounds are ether compounds such as tetrahydrofuran, diethyl ether, and ethyleneglycol diethyl ether and amine compounds such as triethyl amine and tetramethyl ethylenediamine. The amount of hydrocarbon solvents used in the polymerization processes of the present invention can vary greatly depending upon the types and molecular weights of the polymers (or copolymers) to be produced. Generally speaking, the desirable amount of solvents to be used in 300 through 1000 parts by weight based on 100 parts by weight of the total monomer(s).

The polymerization process of the present invention can be generally carried out at a temperature of $-40°$ C. through 160° C. The desirable polymerization temperature is 30° C. through 120° C., especially when conjugated diene polymers or copolymers having a relatively high molecular weight and being suitable for use as starting materials in the manufacture of automotive tires are to be produced. The polymerization processes of the present invention should be carried out under an inert gas atmosphere such as nitrogen and argon. The contamination of the polymerization system with compounds capable of reacting with the organometallic compounds, such as water, carbon dioxide, oxygen, and halogen compounds, should be avoided. The pressure of the polymerization system may be sufficient to maintain the polymerization mixture in a liquid state. Usually, about 1 through 5 atmosphere are used.

The conjugated diene polymers or copolymers obtained from the process of the present invention have extremely excellent characteristics, for example, processabilities such as green strength and tackiness and vulcanizate properties such as tensile strength, abrasion resistance and heat build-up. The conjugated diene polymers or copolymers can be compounded and vulcanized in any conventional manner. These conjugated diene polymers or copolymers can, therefore, be used alone or after blending with natural rubber or other synthetic rubbers in the application fields of automotive tires including tire treads, carcasses and side walls, as well as extruded articles, automotive window frames and various industrial articles. Furthermore, the conjugated diene polymers or copolymers can be grafted onto or blended with various plastics to improve the physical properties such as the impact strength.

The present invention will now be further illustrated by, but is by no means limited to, the Examples set forth hereinbelow.

EXAMPLE 1

One hundred grams of 1,3-butadiene and 400 g of a cyclohexane solvent were charged into an approximately one liter pressure-resistant glass bottle filled with dry nitrogen. A catalyst complex of 0.5 m mol of n-amyl sodium and 0.25 m mol of barium di-t-butoxide was then added to the bottle and the mixture was polymerized at a temperature of 50° C. for 7 hours.

The yield, molecular weight, molecular weight distribution and micro structure of the resultant polymer are shown in Table 1 below.

TABLE 1

| Yield (%) | Molecular weight determined by GPC[*1] | | Microstructure[*2] | | | |
|---|---|---|---|---|---|---|
| | $\overline{Mw}$ ($\times 10^4$) | $\overline{Mw}/\overline{Mn}$ | 1,2-structure (%) | trans-1,4 structure (%) | cis-1,4 structure (%) | trans/cis ratio |
| 100 | 22.6 | 1.29 | 53 | 36 | 11 | 3.3 |

[*1]GPC = Gel Permeation Chromatography
[*2]Microstructure was determined according to a D. Morero method by using an infrared absorption spectrum.

As is clear from the results shown in Table 1, the butadiene polymer having a high trans-1,4 structure content and a relatively narrow molecular weight distribution could be obtained by using a catalyst complex of the organosodium compound and the barium compound.

EXAMPLE 2

Example 1 was repeated, except that isoprene was used as a monomer in lieu of butadiene. The results are shown in Table 2 below.

TABLE 2

| Yield (%) | Molecular weight by GPC | | Microstructure[*1] | |
|---|---|---|---|---|
| | $\overline{Mw}$ ($\times 10^4$) | $\overline{Mw}/\overline{Mn}$ | 3,4-structure (%) | 1,4-structure (%) |
| 100 | 22.5 | 1.32 | 48 | 52 |

[*1]Microstructure was determined by using an infrared absorption spectrum.

EXAMPLES 3 TO 7 AND COMPARATIVE EXAMPLES 1 TO 6

Twenty five grams of styrene, 75 g of 1,3-butadiene and 400 g of a cyclohexane solvent were added to an approximately one liter pressure-resistant glass bottle filled with dry nitrogen. A catalyst complex each listed in Table 3 below was then added to the bottle and the mixture was polymerized at a temperature of 50° C. for 7 hours. A portion of the polymer solution was withdrawn from the bottle at the conversion of less than 20% during the course of the polymerization and the bound styrene of the initial polymer was determined.

As comparative examples, the above-mentioned polymerization experiments were repeated, except that conventional catalysts listed in Table 3 below were used in lieu of the catalyst complexes.

As is clear from Table 3 below, the polymers of Examples 3 to 7 obtained by using the catalyst complexes consisting essentially of the organosodium compounds and the organic compounds of the II A metals have a high trans/cis ratio in the 1,4-structure of the butadiene moiety, as compared with those of Comparative Examples 1 to 4. The polymers having a high trans/cis ratio, for example, a trans/cis ratio of 1.8 or more can also be obtained by using conventional catalysts as shown in Comparative Examples 5 and 6. These catalysts, however, result in a low polymerization conversion and a poor styrene-butadiene copolymerization reactivity ratio as shown in the initial bound styrene contents in Table 3. Furthermore, these polymers have a disadvantage in that the molecular weight distribution thereof is broad.

As is clear from a comparison of the Examples with the Comparative Examples in Table 3 below, the polymerization processes of conjugated dienes using the novel catalyst complexes according to the present invention have the following advantages:

(a) The polymerization activity of the catalysts is high;

(b) Copolymers having an excellent random distribution of conjugated dienes (e.g. butadiene) and aromatic vinyl hydrocarbons (e.g. styrene) can be obtained;

(c) Copolymers having a high trans/cis ratio in the 1,4-structure of the butadiene moiety can be obtained; and (d) Copolymers having a relatively narrow molecular weight distribution can be obtained.

It is also clear from the results shown in Table 3 below that the 1,2-structure content and the ratio of the trans-1,4 structure/cis-1,4 structure of the copolymers can be controlled by changing the combination and composition of the catalyst complexes.

TABLE 3

| | Catalyst | | Initial bound styrene[*1] (%) | Yield (%) | Bound styrene (%) | Block styrene[*2] (%) | Molecular weight by GPC | | Microstructure in butadiene moiety | | | |
|---|---|---|---|---|---|---|---|---|---|---|---|---|
| | Catalyst component[*4] (1) | Catalyst component[*4] (2) | | | | | $\overline{Mw}$ ($\times 10^4$) | $\overline{Mw}/\overline{Mn}$ | 1,2-structure (%) | Trans-1,4 structure (%) | Cis-1,4 structure (%) | Trans/cis ratio |
| Example | | | | | | | | | | | | |
| 3 | nC5H11Na 0.5 | Ba—[OC(CH3)3]2 0.5 | 26 | 96 | 25 | 0 | 24.9 | 1.31 | 44 | 45 | 11 | 4.1 |
| 4 | nC5H11Na 0.5 | Ba—[OC(CH3)3]2 0.25 | 26 | 100 | 25 | 0 | 22.8 | 1.33 | 53 | 37 | 10 | 3.7 |
| 5 | nC5H11Na 0.5 | Ba—[OC(CH3)3]2 0.125 | 27 | 100 | 25 | 0 | 19.6 | 1.34 | 58 | 33 | 9 | 3.7 |
| 6 | nC5H11Na 0.5 | Sr—[OC(CH3)3]2 0.25 | 29 | 100 | 25 | 0 | 18.2 | 1.40 | 59 | 30 | 11 | 2.7 |
| 7 | nC5H11Na 0.5 | Ca—[OCH(CH3)2]2 0.25 | 29 | 98 | 25 | 0 | 11.8 | 1.76 | 64 | 25 | 11 | 2.3 |
| Comparative Example | | | | | | | | | | | | |
| 1 | nC5H11Na 0.5 | None | 32 | 41 | 30 | 0 | 3.2 | 1.94 | 68 | 20 | 12 | 1.7 |
| 2 | nC5H11Na 0.5 | LiOC(CH3)3 0.5 | 30 | 100 | 25 | 0 | 24.3 | 1.22 | 60 | 25 | 15 | 1.7 |
| 3 | nC4H9Li | None | 3 | 84 | 8 | 17.0 | 17.5 | 1.03 | 10 | 52 | 38 | 1.4 |

TABLE 3-continued

| | Catalyst | | Initial | | | Block | Molecular | | Microstructure in butadiene moiety | | | |
|---|---|---|---|---|---|---|---|---|---|---|---|---|
| | Catalyst compo-nent[*4] (1) | Catalyst component[*4] (2) | bound styrene[*1] (%) | Yield (%) | Bound styrene (%) | sty-rene[*2] (%) | weight by GPC | | 1,2-struc-ture (%) | Trans-1,4 structure (%) | Cis-1,4 struc-ture (%) | Trans/cis ratio |
| | | | | | | | $\overline{Mw}$ $(\times 10^4)$ | $\overline{Mw}/\overline{Mn}$ | | | | |
| 4 | 0.5 nC$_4$H$_9$Li | Tetrahydrofuran | 15 | 100 | 25 | 0 | 22.1 | 1.03 | 34 | 40 | 26 | 1.5 |
| | 0.5 | 5.0 | | | | | | | | | | |
| 5 | nC$_4$H$_9$Li | Ba–[OC(CH$_3$)$_3$]$_2$ | 15 | 89 | 22 | 0 | 11.6 | 2.21 | 12 | 63 | 25 | 2.5 |
| | 0.5 | 0.25 | | | | | | | | | | |
| 6 | (C$_4$H$_9$)$_2$Mg | Ba–[OC(CH$_3$)$_3$]$_2$ | 13 | 62 | 21 | 0 | 6.7 | 1.91 | 9 | 79 | 22 | 3.6 |
| | | 0.25 | | | | | | | | | | |

[*1]Determined by ultraviolet absorption spectrum
[*2]Determined according to Kolthoff method (I. M. Kolthoff, J. Polymer Sci., 1,429–433 (1946))
[*3]Determined by infrared absorption spectrum according to a Hampton method
[*4]M mol per 100 g of the total monomers

EXAMPLES 8 TO 22

The copolymerization runs were repeated in the same manner as described in Examples 3 to 7, except that the components of the catalyst complexes of the present invention were changed. The amounts of the catalyst components used in these runs, based on 100 g of the total monomers, were as follows.

Component (a): 0.5 m mol
Component (b): 0.25 m mol
Component (c): 0.25 m mol

The results are shown in Table 4 below.

Examples 8 to 10 used sodium amide, metallic sodium and a mixture of the organosodium compound and the organic compound of sodium as the catalyst component (a). As is clear from the results shown in Table 4 below, these catalyst components (a) result in the advantages similar to those obtained by using the organosodium compounds.

Examples 11 to 13 used the barium salts of various organic compounds as the catalyst component (b). As is clear from the results shown in Table 4, these various barium salts are effective as the catalyst component (b) of the catalyst complexes of the present invention.

Examples 14 to 22 use the organometallic compounds of various electron deficient metals as the component (c). As is clear from the results in Table 4, the ratio of trans-1,4/cis-1,4 structures can be further increased.

TABLE 4

| | Catalyst complex | | | Initial | | | Block | Molecular weight by GPC | | Microstructure in butadiene moiety | |
|---|---|---|---|---|---|---|---|---|---|---|---|
| Example | Catalyst component (a) | Catalyst component (b) | Catalyst component (c) | bound styrene (%) | Yield (%) | Bound styrene (%) | styrene (%) | $\overline{Mw}$ $(\times 10^4)$ | $\overline{Mw}/\overline{Mn}$ | 1,2-struc-ture (%) | Trans/cis ratio |
| 8 | ⟨N—Na⟩ | Ba–[OC(OH$_3$)$_3$]$_2$ | None | 26 | 80 | 26 | 0 | 16.3 | 1.46 | 54 | 4.1 |
| 9 | Sodium dispersion | " | " | 26 | 86 | 26 | 0 | 41.6 | 1.44 | 48 | 4.5 |
| 10 | *1 | " | " | 26 | 99 | 25 | 0 | 35.7 | 1.32 | 51 | 3.9 |
| 11 | nC$_5$H$_{11}$Na | (C$_9$H$_{19}$–⟨O⟩–O)$_2$Ba | " | 26 | 100 | 25 | 0 | 22.9 | 1.31 | 52 | 3.8 |
| 12 | " | (C$_{12}$H$_{25}$–⟨O⟩–SO$_3$)$_2$Ba | " | 26 | 98 | 25 | 0 | 25.3 | 1.40 | 51 | 3.9 |
| 13 | " | (C$_{17}$H$_{35}$COO)$_2$Ba | " | 26 | 97 | 25 | 0 | 25.6 | 1.41 | 51 | 3.9 |
| 14 | " | Ba–[OC(CH$_3$)$_3$]$_2$ | LinO$_4$H$_9$ | 26 | 100 | 25 | 0 | 12.7 | 1.29 | 32 | 4.3 |
| 15 | " | " | Be(C$_2$H$_5$)$_2$ | 24 | 99 | 25 | 0 | 23.1 | 1.35 | 25 | 4.8 |
| 16 | " | " | Mg(nC$_4$H$_9$)$_2$ | 25 | 100 | 25 | 0 | 11.9 | 1.31 | 26 | 4.7 |
| 17 | " | " | Zn(C$_2$H$_5$)$_3$ | 25 | 100 | 25 | 0 | 23.8 | 1.29 | 46 | 4.7 |
| 18 | " | " | Cd(C$_2$H$_5$)$_3$ | 26 | 100 | 25 | 0 | 22.4 | 1.30 | 47 | 4.6 |
| 19 | " | " | B(C$_2$H$_5$)$_3$ | 23 | 95 | 24 | 0 | 26.7 | 1.29 | 40 | 5.1 |
| 20 | " | " | Al(C$_2$H$_5$)$_3$ | 24 | 99 | 25 | 0 | 25.5 | 1.24 | 41 | 5.6 |
| 21 | " | " | Ga(C$_2$H$_5$)$_3$ | 25 | 100 | 25 | 0 | 22.3 | 1.30 | 45 | 4.6 |
| 22 | " | " | In(C$_2$H$_5$)$_3$ | 25 | 100 | 25 | 0 | 22.6 | 1.31 | 45 | 4.6 |

*1 A mixture of 0.25 m mol of n-C$_5$H$_{11}$Na and 0.25 m mol of (CH$_3$)$_3$CONa

EXAMPLE 23

The copolymerization run of Example 1 was repeated, except that 25 g of styrene and 75 g of isoprene were used as monomers. The results are shown in Table 5 below.

TABLE 5

TABLE 7

|  | Example 25 |  |  |  |  | Comparative Example 7 |  |  |  |  |  |
| --- | --- | --- | --- | --- | --- | --- | --- | --- | --- | --- | --- |
|  | A | B | C | D | E | F | G | H | I | J | K |
| Butadiene (kg) | 1 | 0.82 | 0.75 | 0.75 | 0.75 | 1 | 0.75 | 1 | 0.75 | 1 | 0.75 |
| Styrene (kg) | 0 | 0.18 | 0.25 | 0.25 | 0.25 | 0 | 0.25 | 0 | 0.25 | 0 | 0.25 |
| Catalyst and additive (m mol) | nC$_5$H$_{11}$Na ←4 m mol→ Ba$+$OC(CH$_3$)$_3$]$_3$ 2 m mol | | | *1 | *2 | nC$_4$H$_9$Li 4 m mol E D M E | nC$_4$H$_9$Li 3 m mol Ba$+$OC(CH$_3$)$_3$]$_2$ 1.5 m mol | | (C$_4$H$_9$)$_2$Mg 3 m mol Ba$+$OC(CH$_3$)$_3$]$_2$ 1.5 m mol | | |
| Conversion (%) | 100 | 99 | 98 | 96 | 92 | 100 | 100 | 92 | 77 | 79 | 59 |
| Mooney viscosity (ML$_{1+4}$ 100° C.) | 47 | 52 | 51 | 46 | 48 | 55 | 46 | 42 | 43 | 47 | 41 |
| Molecular weight distribution (Mw/Mn) | 1.32 | 1.36 | 1.38 | 1.41 | 1.46 | 1.08 | 1.10 | 2.36 | 2.41 | 1.88 | 1.97 |
| Bound styrene (%) | 0 | 18 | 25 | 25 | 25 | 0 | 25 | 0 | 22 | 0 | 20 |
| Block styrene (%) | 0 | 0 | 0 | 0 | 0 | 0 | 0 | 0 | 0 | 0 | 0 |
| 1,2-structure (%) | 39 | 41 | 42 | 35 | 29 | 38 | 40 | 12 | 13 | 9 | 9 |
| Trans/cis ratio | 3.1 | 3.4 | 3.5 | 3.7 | 3.9 | 1.5 | 1.5 | 2.5 | 2.4 | 3.6 | 3.5 |
| Melting point (°C.)*3 | None | None | None | None | None | None | None | None | None | 23 | None |

*1nC$_5$H$_{11}$Na 3 m mol + Ba$+$OC(CH$_3$)$_3$]$_2$ 2 m mol + Mg(nC$_4$H$_9$)$_2$ 0.5 m mol
*2nC$_5$H$_{11}$Na 2 m mol + Ba$+$OC(CH$_3$)$_3$]$_2$ 2 m mol + Mg(nC$_4$H$_9$)$_2$ 1 m mol
*3Determined by a differential thermal analyzer

|  |  | Molecular weight |  | Microstructure |  |
| --- | --- | --- | --- | --- | --- |
| Yield (%) | Styrene content (%) | $\overline{Mw}$ (× 10$^4$) | $\overline{Mw}/\overline{Mn}$ | 3,4-structure (%) | 1,4-structure (%) |
| 99 | 25 | 19.8 | 1.41 | 46 | 54 |

EXAMPLE 24

The copolymerization run of Example 1 was repeated, except that a mixed solvent of 400 g of cyclohexane and 1.0 m mol of tetramethyl ethylenediamine was used. The results are shown in Table 6 below.

TABLE 6

|  | Molecular weight by GPC |  | Microstructure in butadiene moiety |  |  |  |
| --- | --- | --- | --- | --- | --- | --- |
| Yield (%) | $\overline{Mw}$ (× 10$^4$) | $\overline{Mw}/\overline{Mn}$ | 1,2 structure (%) | Trans-1,4 structure (%) | Cis-1,4 structure (%) | Trans cis ratio |
| 100 | 21.1 | 1.21 | 80 | 15 | 5 | 3.0 |

EXAMPLE 25 AND COMPARATIVE EXAMPLE 7

The monomers and the catalyst complexes having the compositions listed in Table 7 below were charged, together with 4 kg of a cyclohexane solvent, into an approximately 10 liter autoclave filled with dry nitrogen and polymerized at a temperature of 65° C. for 3 hours. After completing the polymerization, a small amount of methanol was added to the polymerization mixture to deactivate the living polymer. Thereafter, 0.3 parts by weight of BHT (i.e. 3,5-di-tert-butyl-3-hydroxytoluene) based on 100 parts by weight of the copolymer was added as a stabilizer and the cyclohexane was vaporized and removed from the polymer solution. Thus, polymers A to E of Example 25 and polymers F to K of Comparative Example 7 were obtained. The Mooney viscosity, molecular weight distribution, styrene content, microstructure in the butadiene moiety and melting point of the resultant polymers are also shown in Table 7 below. Polymers F and G of Comparative Example 7 had a high 1,2-structure content and a low trans/cis ratio in the 1,4-structure. Polymers H through K were those having a high trans/cis ratio in the 1,4-structure of the butadiene moiety, prepared from conventional processes.

Polymers A to E of Example 25 and polymers F to K of comparative Example 7 as well as a commercially available solution polymerization type butadiene polymer (i.e. Diene NF 50R available from Asahi Kasei Kogyo Kabushiki Kaisha in Japan), a solution polymerization type styrene-butadiene copolymer (i.e. Tufdene 2000R available from Asahi Kasei Kogyo Kabushiki Kaisha in Japan) and an emulsion polymerization type styrene-butadiene copolymer (i.e. SBR-1502 available from Nihon Gosei Gomu Kabushiki Kaisha) were independently mixed in the compositions listed in Table 8 below by using a B-type Banbury mixer to produce compounds.

TABLE 8

| Compounding Formulation | |
| --- | --- |
| Component | Parts by Weight |
| Polymer | 100 |
| Aromatic process oil*1 | 20 |
| HAF carbon | 60 |
| Zinc oxide | 4 |
| Stearic acid | 3 |
| Antioxidant B*2 | 1.3 |
| Sulfur | 2 |
| Vulcanizing accelerator CZ*3 | 1.5 |

*1Specific density = 0.951, VGC = 0.961
*2Reaction product of diphenylamine and acetone
*3N—cyclohexyl benzothiazole sulfenamide The processability of the compounds thus obtained and the properties of the vulcanizates thereof were evaluated. Vulcanization was carried out by heating the compounds at a temperature of 141° C. for 40 minutes. The results are shown in Table 9 below.

The roll operation ability of the compounds of polymers A to E of Example 25 was clearly superior to that of the compounds of polymers F to K of Comparative Example 7, and was substantially comparable to that of the commercially available products.

The compound of polymer J of Comparative Example 7 having a high trans/cis ratio in the 1,4-structure of the butadiene moiety exhibited an extremely high green strength. However, unvulcanized polymer J showed a crystallization property in the DSC analysis and the tackiness of the compound was extremely low due to the crystallization property of polymer J. Contrary to this, polymers A to E of Example 25 according to the present invention have no crystallization property in the DSC analysis, in spite of their high trans/cis ratios in the 1,4-structure of the butadiene moiety. Furthermore, the balance of the processability represented by the roll operation ability, green strength, elongation and tackiness of polymers A to E of Example 25 was superior to that of polymers F to K of Comparative Example 7 and was comparable to that of commercially available emulsion polymerization type SBR (i.e. SBR 1502).

The physical properties of the vulcanizates of, for example, the styrene-butadiene copolymers of Example 25 according to the present invention (i.e. polymers B to E) are advantageous in respect to the following points, as compared with the styrene-butadiene copolymers of Comparative Example 7 (i.e. polymers G, I, K), the commercially available solution polymerization type styrene-butadiene rubber (i.e. Tufdene 2000R) and the commercially available emulsion polymerization type styrene-butadiene rubber (i.e. SBR-1502).

(a) The tensile strengths of copolymers B to E according to the present invention are comparable to the commercially available emulsion type SBR and are superior to the commercially available solution type SBR and copolymers G, I and K of Comparative Example 7.

(b) Generally speaking, an anti-wet skid property is contrary to an abrasion resistance property. That is, a polymer having a good anti-wet skid property generally has a poor abrasion resistance. However, copolymers B to E according to the present invention have an anti-wet skid property comparable to or greater than that of the commercially available emulsion polymerization type SBR (i.e. SBR 1502) and superior to that of the commercially available solution polymerization type SBR (i.e. Tufdene 2000R). On the other hand, copolymers B to E according to the present invention have an abrasion resistance property superior to that of SBR 1502 and near that of Tufdene 2000R. Contrary to this, copolymers G, I and K do not have a good balance of both properties, although the copolymers having either a good abrasion resistance property or a good anti-wet skid property are present.

(c) Copolymers B to E according to the present invention have a low heat build-up property superior to those of all the comparative copolymers, that is, comparative copolymers G, I and J, Tufdene 2000R and SBR 1502.

Furthermore, as is clear from the comparison of butadiene polymers, the polymer according to the present invention (i.e. polymer A) also has the above-mentioned good properties as compared with the comparative butadiene polymers (i.e. polymers F, H and J and the commercially available Diene NF50R).

As is clear from the above discussion, the polymers (or copolymers) obtained from the polymerization processes using the catalyst complexes have a good balance of properties with respect to the processability of the polymers and the strength, heat build-up property, anti-wet skid property and abrasion resistance property of the vulcanizates thereof.

TABLE 9

|  | Example 25 ||||| 
|---|---|---|---|---|---|
|  | A | B | C | D | E |
| Compound mooney viscosity*1 (ML$_{1+4}$ 100° C.) | 65 | 68 | 67 | 64 | 65 |
| Rolling ability | Good | Good | Good | Good | Good |
| Green characteristics |  |  |  |  |  |
| Green strength (kg/cm$^2$) | 2.7 | 2.5 | 2.5 | 2.9 | 3.1 |
| Elongation*2 (%) | 450 | 450 | 500 | 500 | 550 |
| Tackiness*3 (kg/cm$^2$) | 0.33 | 0.36 | 0.45 | 0.41 | 0.41 |
| Vulcanizate properties |  |  |  |  |  |
| Hardness*4 (JIS) | 63 | 63 | 64 | 63 | 63 |
| 300% modulus*4 (kg/cm$^2$) | 74 | 87 | 94 | 91 | 91 |
| Tensile strength*4 (kg/cm$^2$) | 206 | 228 | 243 | 244 | 252 |
| Elongation*4 (%) | 660 | 670 | 690 | 660 | 680 |
| Anti-wet skid*5 (index) | 88 | 100 | 106 | 102 | 100 |
| Impact resilience*4 (%) | 54 | 45 | 39 | 41 | 43 |
| Abrasion resistance*6 (index) | 163 | 112 | 101 | 109 | 116 |
| Heat build-up*7 ΔT(°C.) | 32 | 32 | 33 | 31 | 31 |

|  | Comparative Example 7 |||||| Diene NF50R*8 | Tufdene 2000R*8 | SBR 1502 |
|---|---|---|---|---|---|---|---|---|---|
|  | F | G | H | I | J | K |  |  |  |
| Compound mooney viscosity*1 (ML$_{1+4}$ 100° C.) | 71 | 65 | 56 | 56 | 60 | 55 | 64 | 61 | 64 |
| Rolling ability | Poor | Poor | Fair | Fair | Poor | Fair | Good | Good | Good |
| Green characteristics |  |  |  |  |  |  |  |  |  |
| Green strength (kg/cm$^2$) | 2.6 | 2.3 | 1.8 | 1.5 | 20.3 | 2.8 | 2.5 | 2.2 | 1.7 |
| Elongation*2 (%) | 150 | 170 | 400 | 500 | 250 | 550 | 250 | 320 | 450 |
| Tackiness*3 (kg/cm$^2$) | 0.13 | 0.16 | 0.33 | 0.37 | 0.05 | 0.31 | 0.18 | 0.26 | 0.37 |
| Vulcanizate properties |  |  |  |  |  |  |  |  |  |
| Hardness*4 (JIS) | 63 | 63 | 62 | 62 | 60 | 60 | 62 | 64 | 64 |
| 300% modulus*4 (kg/cm$^2$) | 78 | 94 | 71 | 84 | 60 | 65 | 74 | 82 | 95 |
| Tensile strength*4 (kg/cm$^2$) | 170 | 190 | 174 | 193 | 162 | 184 | 165 | 226 | 239 |
| Elongation*4 (%) | 560 | 560 | 620 | 610 | 620 | 640 | 580 | 670 | 650 |
| Anti-wet skid*5 (index) | 87 | 103 | 75 | 91 | 74 | 88 | 76 | 94 | 100 |
| Impact resilience*4 (%) | 54 | 39 | 53 | 46 | 53 | 47 | 54 | 46 | 44 |
| Abrasion resistance*6 (index) | 132 | 74 | 165 | 117 | 166 | 117 | 185 | 120 | 100 |

TABLE 9-continued

| Heat build-up*[7] ΔT(°C.) | 33 | 35 | 41 | 40 | 44 | 43 | 40 | 38 | 39 |
| --- | --- | --- | --- | --- | --- | --- | --- | --- | --- |

*[1]JIS-K6300
*[2]JIS #1 dumbbell, stress rate 500 nm/min
*[3]Monsanto tuckmeter
*[4]JIS-K6301
*[5]Gravitational friction coefficient between the vulcanizate and wetted concrete road surface was determined using a slide rheostat developed by British Road Institute.
*[6]Pico abrasion tester, ASTM D-2228
*[7]Goodrich flexometer, ASTM D-623-58(A)
*[8]Available from Asahi Kasei Kogyo Kabushiki Kaisha

EXAMPLES 26 TO 57

The copolymerization runs were repeated in the same manner as described in Examples 3 to 7, except that the components of the catalyst complexes were changed. The structures and amounts of the catalyst components used and the results are shown in Table 10 below.

Examples 26 to 36 use the mixtures of an organosodium compound, metallic sodium or a sodium amide compound and organic compounds of sodium as the component (a) of the present catalyst complex. As is clear from the results of Examples 26 to 36, various sodium salts of organic compounds are effective as the organic compound of sodium of the catalyst component (a).

Examples 37 to 48 use the organic compounds or the organometallic compounds of barium as the catalyst component (b). Barium is selected as a typical example of the metals of the component (a) (i.e. barium, strontium and calcium). It is clear from the results of Examples 37 to 48 that these compounds are effective as the component (b) of the present catalyst complexes.

Examples 49 to 57 use the organometallic compounds of magnesium or aluminum, which is selected as a typical example of the electron deficient metals of the component (a). It is also clear from the results of Examples 49 to 57 that various organometallic compounds having the general formula $$R^9_{p-q}Me^2X_q$$

wherein $R^9$, $Me^2$, p and q are the same as defined above are effective as the component (c) of the present catalyst complexes.

TABLE 10

| Example | Catalyst system Component[4] (1) | Catalyst system Component[4] (1') | Catalyst system Component[4] (2) | Initial bound styrene[1] (%) | Yield (%) | Bound styrene (%) | Block styrene[2] (%) | Molecular weight by GPC $\overline{Mn}$ ($\times 10^4$) | Molecular weight by GPC $\overline{Mw}/\overline{Mn}$ | Microstructure in butadiene moiety[3] 1,2-structure (%) | Microstructure in butadiene moiety[3] Trans-1,4 structure (%) | Microstructure in butadiene moiety[3] Cis-1,4 structure (%) | Trans/cis ratio |
|---|---|---|---|---|---|---|---|---|---|---|---|---|---|
| 26 | nC₅H₁₁Na 0.5 | NaS—n-C₄H₉ 0.25 | Ba₊OC(CH₃)₃]₂ 0.25 | 27 | 100 | 25 | 0 | 19.3 | 1.41 | 54 | 37 | 9 | 4.1 |
| 27 | nC₅H₁₁Na 0.5 | NaO—⌬—C₉H₁₉ 0.25 | Ba₊OC(CH₃)₃]₂ 0.25 | 27 | 100 | 25 | 0 | 18.7 | 1.33 | 49 | 40 | 11 | 3.6 |
| 28 | nC₅H₁₁Na 0.5 | Na—S—⌬⌬ 0.25 | Ba₊(OC(CH₃)₃]₂ 0.25 | 27 | 99 | 25 | 0 | 18.8 | 1.36 | 53 | 37 | 10 | 3.7 |
| 29 | nC₅H₁₁Na 0.5 | NaOCO—n-C₁₇H₃₅ 0.25 | Ba₊OC(CH₃)₃]₂ 0.25 | 27 | 97 | 25 | 0 | 19.5 | 1.42 | 53 | 37 | 10 | 3.7 |
| 30 | nC₅H₁₁Na 0.5 | NaSCS—n-C₁₂H₂₅ 0.25 | Ba₊OC(CH₃)₃]₂ 0.25 | 27 | 96 | 25 | 0 | 20.2 | 1.41 | 55 | 36 | 9 | 4.0 |
| 31 | nC₅H₁₁Na 0.5 | NaOCOCOO—n-C₆H₁₃ 0.25 | Ba₊OC(CH₃)₃]₂ 0.25 | 28 | 96 | 25 | 0 | 20.4 | 1.44 | 56 | 35 | 9 | 3.9 |
| 32 | nC₅H₁₁Na 0.5 | NaCSCSS—n-C₄H₉ 0.25 | Ba₊OC(CH₃)₃]₂ 0.25 | 28 | 95 | 26 | 0 | 20.9 | 1.46 | 55 | 36 | 9 | 4.0 |
| 33 | nC₅H₁₁Na 0.5 | nC₁₈H₃₇OSO₃Na 0.25 | Ba₊OC(CH₃)₃]₂ 0.25 | 28 | 98 | 25 | 0 | 19.0 | 1.39 | 53 | 38 | 9 | 4.2 |
| 34 | nC₅H₁₁Na 0.5 | nC₁₂H₂₅—⌬—SO₃Na 0.25 | Ba₊OC(CH₃)₃]₂ 0.25 | 27 | 98 | 25 | 0 | 19.3 | 1.37 | 53 | 38 | 9 | 4.2 |
| 35 | Sodium dispersion 0.5 | NaOC(CH₃)₃ 0.25 | Ba₊OC(CH₃)₃]₂ 0.25 | 27 | 89 | 26 | 0 | 27.1 | 1.46 | 52 | 38 | 10 | 3.8 |
| 36 | ⌬N—Na 0.5 | NaOC(CH₃)₃ 0.25 | Ba₊OC(CH₃)₃]₂ 0.25 | 27 | 83 | 26 | 0 | 18.6 | 1.48 | 54 | 37 | 9 | 4.1 |

TABLE 10-continued

| Example | Catalyst system Component*4 (1) | Component*4 (2) | Component*4 (3) | Initial bound styrene*1 (%) | Yield (%) | Bound styrene (%) | Block styrene*2 (%) | Molecular weight by GPC $\overline{Mn}$ ($\times 10^4$) | $\overline{Mw}/\overline{Mn}$ | Microstructure in butadiene moiety*3 1,2-structure (%) | Trans-1,4 structure (%) | Cis-1,4 structure (%) | Trans/cis ratio |
|---|---|---|---|---|---|---|---|---|---|---|---|---|---|
| 37 | nC$_4$H$_9$Na 0.5 | Ba(O—n-C$_3$H$_7$)$_2$ 0.25 | | 27 | 100 | 25 | 0 | 22.2 | 1.32 | 53 | 37 | 10 | 3.7 |
| 38 | nC$_4$H$_9$Na 0.5 | Ba(S—n-C$_4$H$_9$)$_2$ 0.25 | | 27 | 100 | 25 | 0 | 22.1 | 1.34 | 50 | 40 | 10 | 4.0 |
| 39 | nC$_4$H$_9$Na 0.5 | Ba(S—C$_6$H$_5$)$_2$ 0.25 | | 27 | 100 | 25 | 0 | 21.3 | 1.35 | 55 | 35 | 10 | 3.5 |
| 40 | nC$_4$H$_9$Na 0.5 | Ba(SCS—n-C$_9$H$_{19}$)$_2$ 0.25 | | 27 | 99 | 25 | 0 | 23.7 | 1.34 | 52 | 38 | 10 | 3.8 |
| 41 | nC$_4$H$_9$Na 0.5 | Ba(OCOCOO—n-C$_6$H$_{13}$)$_2$ 0.25 | | 26 | 97 | 25 | 0 | 24.1 | 1.44 | 51 | 39 | 10 | 3.9 |
| 42 | nC$_4$H$_9$Na 0.5 | Ba(SCSCSS—tert-C$_4$H$_9$)$_2$ 0.25 | | 26 | 95 | 26 | 0 | 24.3 | 1.48 | 50 | 39 | 11 | 3.5 |
| 43 | nC$_4$H$_9$Na 0.5 | (nC$_{12}$H$_{25}$—C$_6$H$_4$—SO$_3$)$_2$Ba 0.25 | | 27 | 100 | 25 | 0 | 22.3 | 1.33 | 54 | 36 | 10 | 3.6 |
| 44 | nC$_4$H$_9$Na 0.5 | (n-C$_{19}$H$_{37}$OSO$_3$)$_2$Ba 0.25 | | 27 | 99 | 25 | 0 | 22.5 | 1.30 | 52 | 37 | 11 | 3.4 |
| 45 | nC$_4$H$_9$Na 0.5 | Ba[N(C$_2$H$_5$)$_2$]$_2$ 0.25 | | 26 | 100 | 25 | 0 | 19.6 | 1.34 | 57 | 34 | 9 | 3.7 |
| 46 | nC$_4$H$_9$Na 0.5 | Ba(C≡C—C$_2$H$_5$)$_2$ 0.25 | | 27 | 100 | 25 | 0 | 20.1 | 1.43 | 55 | 35 | 10 | 3.5 |
| 47 | nC$_4$H$_9$Na 0.5 | Ba(CH$_3$)$_2$ 0.25 | | 28 | 100 | 25 | 0 | 21.8 | 1.49 | 56 | 35 | 9 | 3.9 |
| 48 | nC$_4$H$_9$Na 0.5 | C$_2$H$_5$BaI 0.25 | | 28 | 100 | 25 | 0 | 19.9 | 1.41 | 50 | 39 | 11 | 3.5 |
| 49 | n-C$_5$H$_{11}$Na 0.5 | Ba[OC(CH$_3$)$_3$]$_2$ 0.25 | C$_2$H$_5$MgCl 0.25 | 24 | 95 | 25 | 0 | 22.2 | 1.32 | 23 | 64 | 13 | 4.9 |
| 50 | n-C$_5$H$_{11}$Na 0.5 | Ba[OC(CH$_3$)$_3$]$_2$ 0.25 | C$_2$H$_5$MgH 0.25 | 25 | 98 | 25 | 0 | 18.5 | 1.38 | 25 | 62 | 13 | 4.8 |
| 51 | n-C$_5$H$_{11}$Na 0.5 | Ba[OC(CH$_3$)$_3$]$_2$ 0.25 | C$_2$H$_5$MgOCH(CH$_3$)$_2$ 0.25 | 25 | 99 | 25 | 0 | 19.9 | 1.33 | 26 | 61 | 13 | 4.7 |
| 52 | n-C$_5$H$_{11}$Na 0.5 | Ba[OC(CH$_3$)$_3$]$_2$ 0.25 | (C$_2$H$_5$)$_2$AlCl 0.25 | 24 | 95 | 25 | 0 | 28.6 | 1.23 | 39 | 51 | 10 | 5.1 |

TABLE 10-continued

| Example | Catalyst system | | Initial bound styrene*1 (%) | Yield (%) | Bound styrene (%) | Block styrene*2 (%) | Molecular weight by GPC | | Microstructure in butadiene moiety*3 | | | Trans/cis ratio |
|---|---|---|---|---|---|---|---|---|---|---|---|---|
| | | | | | | | $\overline{Mn}$ (× 10⁴) | $\overline{Mw}/\overline{Mn}$ | 1,2-structure (%) | Trans-1,4 structure (%) | Cis-1,4 structure (%) | |
| 53 | n-C₅H₁₁Na 0.5 | Ba[OC(CH₃)₃]₂ 0.25 | (C₂H₅)₂AlH 0.25 | 25 | 99 | 25 | 0 | 25.3 | 1.21 | 41 | 50 | 9 | 5.6 |
| 54 | n-C₅H₁₁Na 0.5 | Ba[OC(CH₃)₃]₂ 0.25 | (C₂H₅)₂AlOCH(CH₃)₂ 0.25 | 25 | 98 | 25 | 0 | 25.5 | 1.25 | 42 | 49 | 9 | 5.4 |
| 55 | n-C₅H₁₁Na 0.5 | Ba[OC(CH₃)₃]₂ 0.25 | C₂H₅Al[OCH(CH₃)₂]₂ 0.25 | 25 | 96 | 25 | 0 | 26.7 | 1.32 | 43 | 48 | 9 | 5.3 |
| 56 | n-C₅H₁₁Na 0.5 | Ba[OC(CH₃)₃]₂ 0.25 | Al(C₆H₁₁)₃ 0.25 | 25 | 100 | 25 | 0 | 25.3 | 1.27 | 40 | 51 | 9 | 5.7 |
| 57 | n-C₅H₁₁Na 0.5 | Ba[OC(CH₃)₃]₂ 0.25 | Al(C₆H₅)₃ 0.25 | 26 | 100 | 25 | 0 | 23.2 | 1.31 | 45 | 46 | 9 | 5.1 |

*1, *2, *3 and *4: Please refer to Remarks of Table 3.

We claim:

1. A process for producing a conjugated diene polymer, a copolymer of a conjugated diene with at least one other conjugated diene, or a copolymer of a conjugated diene with an aromatic vinyl hydrocarbon comprising the step of polymerizing said monomer or monomers in the presence of an effective catalytic amount of a catalyst complex consisting essentially of the following components (a) and (b) or (a), (b) and (c):

(a)(1) an organosodium compound, having the general formula

wherein R' is an aliphatic group, desirably having 1 to 30 carbon atoms, an alicyclic group, desirably having 5 to 30 carbon atoms, or an aromatic group, desirably having 6 to 30 carbon atoms or an unsaturated hydrocarbon group having at least one allyl hydrogen and desirably having 3 to 30 carbon atoms, and m is an integer of 1 through 4, (2) metallic sodium or (3) a sodium amide compound having the general formula

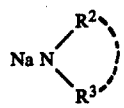

wherein

represents either a cyclized structure or a non-cyclized structure and $R^2$ and $R^3$ represent, in combination, a methylene chain having 2 to 10 carbon atoms in the case of a cyclized structure and $R^2$ and $R^3$ independently represent an aliphatic group, desirably having 1 to 30 carbon atoms, an alicyclic group, desirably having 5 to 30 carbon atoms, or an aromatic group, desirably having 6 to 30 carbon atoms in the case of a non-cyclized structure of (4) a mixture of at least one of the above components (1), (2), and (3) with an organic compound of sodium other than said sodium amide compound;

(b) an organic or organometallic compound of barium, strontium, or calcium; and (c) an organometallic compound of an electron deficient metal selected from lithium, beryllium, magnesium, zinc, cadmium, boron, aluminum, gallium or indium, the amount of component (a) being 0.01 to 50 m mol per 100 g of the total monomers, the amount of component (b) being from 0.01 to 10 times the molar amount of component (a) and the amount of component (c) being from 0 to 5 times the molar amount of component (a).

2. A process as claimed in claim 1, wherein said catalyst component (b) is an organic compound of barium.

3. A process as claimed in claim 1, wherein said catalyst component (c) is an organolithium compound, an organomagnesium compound, or an organoaluminum compound.

4. A process as claimed in claim 1, wherein said conjugated diene is butadiene or isoprene and said aromatic vinyl hydrocarbon is styrene.

5. A process as claimed in claim 1, wherein polymerization is carried out in 300 to 1000 parts by weight per 100 parts by weight of the total monomer of a hydrocarbon solvent at a temperature of 30° to 120° C. in the presence of a catalyst complex comprising 0.1 to 1 m mol of the component (a) based on 100 g of the total monomers, an amount of component (b) of 0.1 to 1 times the molar amount of component (a) and an amount of component (c) of 0 to 2 times the molar amount of component (a).

6. A catalyst complex suitable for use in the production of a conjugated diene polymer, a copolymer of a conjugated diene with at least one other conjugated diene, or a copolymer of a conjugated diene with an aromatic vinyl hydrocarbon consisting essentially of the following components (a) and (b) or (a), (b) and (c):

(a)(1) an organosodium compound, having the general formula

wherein R' is an aliphatic group, desirably having 1 to 30 carbon atoms, an alicyclic group, desirably having 5 to 30 carbon atoms, or an aromatic group, desirably having 6 to 30 carbon atoms or an unsaturated hydrocarbon group having at least one allyl hydrogen and desirably having 3 to 30 carbon atoms, and m is an integer of 1 through 4, (2) metallic sodium or (3) a sodium amide compound having the general formula

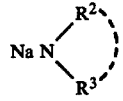

wherein

represents either a cyclized structure or a non-cyclized structure and $R^2$ and $R^3$ represent, in combination, a methylene chain having 2 to 10 carbon atoms in the case of a cyclized structure and $R^2$ and $R^3$ independently represent an aliphatic group, desirably having 1 to 30 carbon atoms, an alicyclic group, desirably having 5 to 30 carbon atoms, or an aromatic group, desirably having 6 to 30 carbon atoms in the case of a non-cyclized structure or (4) a mixture of at least one of the above components (1), (2), and (3) with an organic compound of sodium other than said sodium amide compound;

(b) an organic or organometallic compound of barium, strontium, or calcium; and (c) an organometallic compound of an electron deficient metal selected from lithium, beryllium, magnesium zinc, cadmium, boron, aluminum, gallium or indium, the amount of component (a) being 0.01 to 50 m mol per 100 g of the total monomers, the amount of component (b) being from 0.01 to 10 times the molar amount of component (a) and the amount of component (c) being from 0 to 5 times the molar amount of component (a).

7. A catalyst complex as claimed in claim 6, wherein said catalyst component (b) is an organic compound of barium.

8. A catalyst complex as claimed in claim 6, wherein said catalyst component (c) is an organolithium compound, an organomagesium compound, or an organoaluminum compound.

9. A catalyst complex as claimed in claim 9, wherein said conjugated diene is butadiene or isoprene and said aromatic vinyl hydrocarbon is styrene.

10. A catalyst complex as claimed in wherein the catalyst complex comprises 0.1 to 1 m mol of the component (a) based on 100 g of the total monomers, an amount of component (b) of 0.1 to 1 times the molar amount of component (a) and an amount of component (c) of 0 to 2 times the molar amount of component (a).

11. A catalyst complex as claimed in claim 9, wherein the catalyst complex comprises 0.1 to 1 m mol of the component (a) based on 100 g of the total monomers, an amount of component (b) of 0.1 to 1 times the molar amount of component (a) and an amount of component (c) of 0 to 2 times the molar amount of component (a).

12. The process of claim 4, wherein polymerization is carried out in 300 to 1000 parts by weight per 100 parts by weight of the total monomer of a hydrocarbon solvent at a temperature of 30° to 120° C. in the presence of a catalyst complex comprising 0.1 to 1 m mol of the component (a) based on 100 g of the total monomers, an amount of component (b) of 0.1 to 1 times the molar amount of component (a) and an amount of component (c) of 0 to 2 times the molar amount of component (a).

* * * * *